INVENTORS
SHINICHI KOHYAMA
BY KENZAEMON TANAKA

THEIR ATTORNEYS

United States Patent Office 3,325,864
Patented June 20, 1967

3,325,864
PLASTIC EXTRUDER
Shinichi Kohyama and Kenzaemon Tanaka, Akashi-shi, Japan, assignors to Kawasaki Kokuki Kogyo Kabushiki Kaisha, Hyogo-ken, Japan, a corporation of Japan
Filed Feb. 18, 1965, Ser. No. 433,580
Claims priority, application Japan, Mar. 23, 1964, 39/15,687
8 Claims. (Cl. 18—12)

The present invention relates to an extruder for treating plastic powder and/or plastic chips.

According to the present invention, an improvement is made in an extruder, which comprises a tapered main screw roll and a plurality of tapered sub-screw rolls which engage the main screw roll. The axis of said main screw roll and that of each sub-screw roll intersect at a predetermined angle. Each of said screw rolls has a coarse thread portion provided at the root portion (large diameter portion), a circular groove of predetermined width at the intermediate portion, and a fine thread portion at the tip portion (small diameter portion). In this extruder, the material is forwardly transferred from the coarse thread portion through the circular groove, heat being gradually applied with sufficient pressure to begin melting, into the fine thread portion wherein the material is compressed to be completely molten and sufficient kneading action is applied to the molten material.

Extruders which include a cylindrical main screw roll, or which include a plurality of interengaging tapered screw rolls are well known. But, in an extruder which has three or more tapered screw rolls, if the barrel is of one-piece construction, it becomes often impossible to remove the one-piece barrel leaving the rolls in assembled condition, for the barrel interferes with the rolls.

In these prior extruders, when operation has been stopped, the residual material remaining in the screw roll tends to adhere on the screw rolls and the barrel and causes corrosion thereof due to pyrolysis of the material. Therefore, the barrel should preferably be removable from the screw rolls for cleaning purpose.

Accordingly, the primary object of the present invention is to provide a removable barrel for an extruder which has three or more interengaging tapered screw rolls.

Further, the barrel is desirably of one-piece construction from the structural view point and for uniform heating thereof.

Thus, a further object of the present invention is to provide a one-piece barrel for an extruder which has three or more interengaging tapered screw rolls.

For this purpose, the inventors have found that, by arranged a tapered main screw roll and a plurality of tapered sub-screw rolls to mesh with each other in certain relations, the one-piece barrel can be made removable leaving the rolls in engaged condition. In this extruder, the molten plastic material is often accumulated at the nose portion of the main screw roll and causes stagnation thereof and non-homogeneity of the product. To prevent these defects, a nose screw roll is attached to the forward end of the main screw roll. Preferably, the nose screw roll is removable from the main screw roll. By this construction, the diameter of the nose roll may be made larger than that of the forward end portion of the main screw roll.

In order that the present invention may be more clearly understood and readily carried into effect, reference may now be had to the accompanying drawings in which one embodiment of the present invention is illustrated by way of example, and in which.

Figure 1:
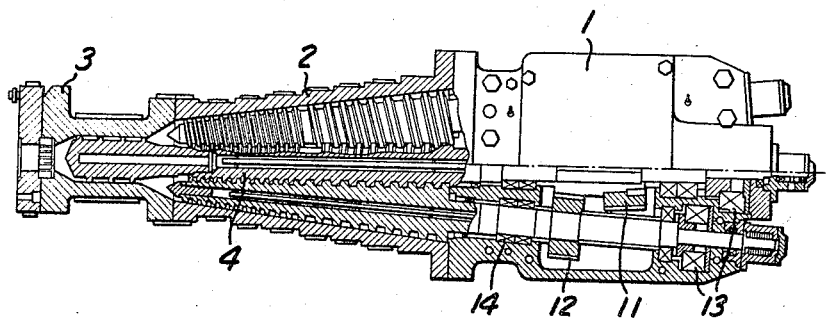
FIG. 1 is a partially broken top plan view of the extruder embodying the present invention.
Figure 2:
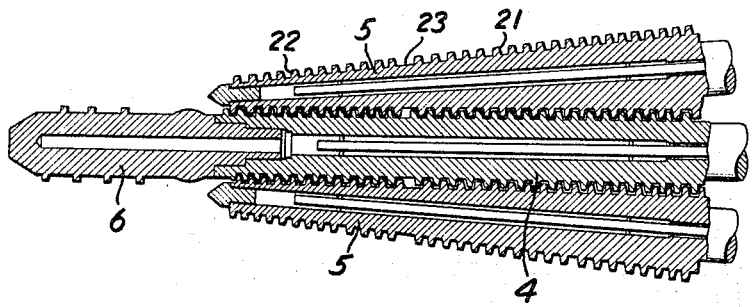
FIG. 2 is a cross-section illustrating the engagement of the screw rolls.
Figure 3:
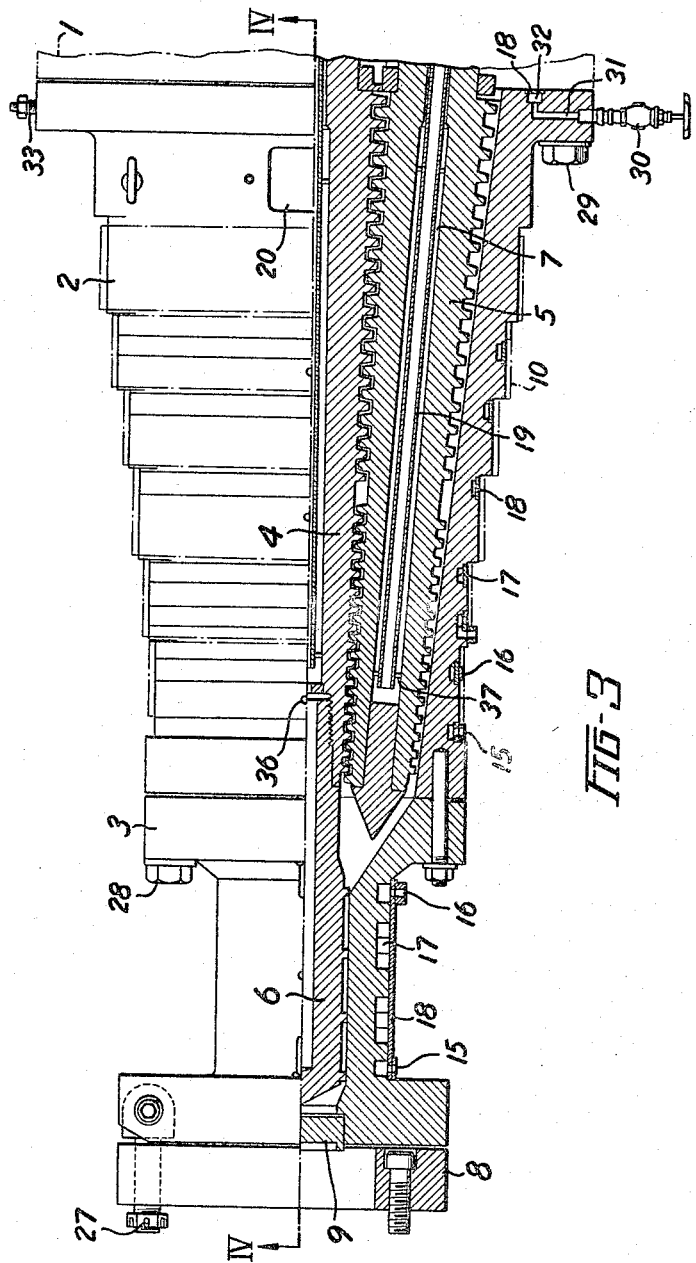
FIG. 3 is a partially broken top plan view of the screw roll portion of the extruder.
Figure 4:
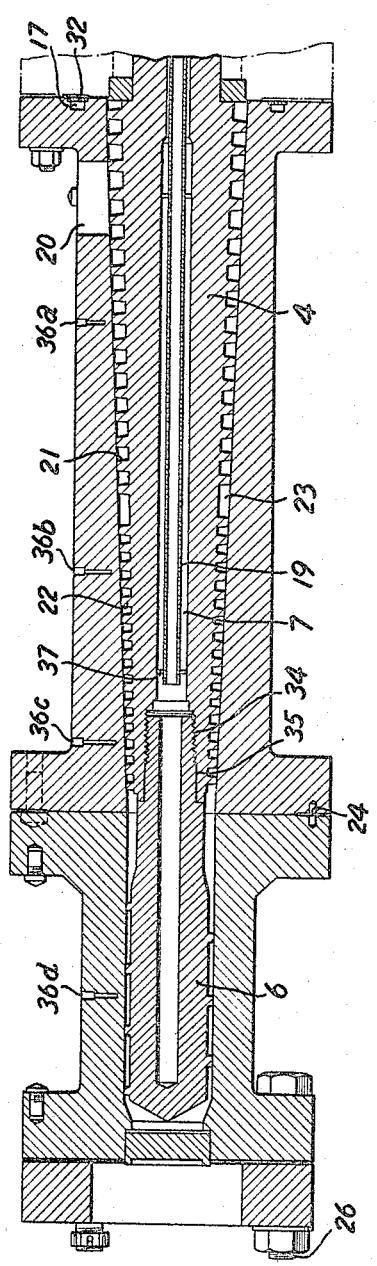
FIG. 4 is a cross-sectional view taken along the line IV—IV of FIG. 3.

Referring now to the drawings, particularly to FIGS. 1 through 4, the extruder includes a barrel 2 which is secured on the gear box 1 by means of a plurality of bolts 29 and a nose barrel 3 which is secured on the barrel 2 by means of bolts 28 and knockpins 24. The barrel 2 encircles a main screw roll 4 and a plurality of sub-screw rolls 5 engaging with the main screw-roll. The axes of the main screw roll 4 and the sub-screw rolls 5 intersect with each other at a pre-determined angle.

The nose screw roll 6 attached to the forward end of the main screw roll 4 is inserted into the nose barrel 3 and carries the plastic material, which is mixed and kneaded under pressure by means of the main screw roll 4 and the sub-screw rolls 5, into the mold through the breaker plate 9 giving further mixing and kneading thereto. The adapter plate 8 which is connected by a hinge bolt 27 is fixed to the nose barrel 3 by means of bolts 26. The nose screw roll 6 is removably connected to the main screw roll 4 by means of an engage portion including a guide portion 35 and a thread portion 34 of which thread direction being reverse to revolution of the screw. The outer surfaces of the barrels 2 and 3 are heated by band heaters 10, and when the thermometers inserted in the holes 36 indicate excessive temperature of the barrel, the cooling medium is introduced into the groove 17 to effect cooling of the barrel. The cooling medium which is introduced from the inlet post 15 passes through the groove 17 which comprises a helical passage covered by a cover plate 18 welded thereon and flows out at the outlet port 16.

To prevent heat being conducted from the barrel 2 to the gear box 1, there is provided a groove 32 into which the cooling medium metered at the valve 30 is introduced through the passage 31 and discharged at the outlet port 33.

The shaft portions of the main screw roll 4 and the sub-screw rolls 5 are rotatably supported by means of the radial bearings 14 and the thrust bearings 13 provided in the gear box 1. The shaft portion of the main screw roll 4 is driven through the reduction gear box and the input gear 11. The sub-screw roll 5 is driven through the gear 12 to rotate at a same speed with the main screw roll 4.

Each of the main screw rolls 4, the nose screw roll 6 and the sub-screw roll 5 is provided with a cooling passage 7 in which a liquid pipe 19 is mounted by means of the pipe supports 37. The cooling liquid is passed through the pipe 19 and is discharged into the cooling passage 7 at the forward end thereof. Then the liquid is exhausted through the exterior of the pipe 19.

The raw plastic material supplied at the material inlet port 20 of the barrel 2 is forced under pressure to the forward direction by means of the coarse thread portions 21 of the main screw roll 4 and the sub-screw rolls 5.

The coarse thread portion terminates at the position of predetermined compression ratio, and a circular groove 23 is provided at the ends thereof into which the raw material is discharged from the coarse thread portions and from which it is introduced into the fine thread portions 22 so as to be forced to forward direction under pressure.

In an extruder comprising a tapered main screw roll 4 and a plurality of tapered sub-screw rolls 5 engaging with said main screw roll 4, if each of the sub-screw rolls 5 is engaging with said main screw roll 4 in same condition, it is obviously the best way to remove the barrel along the axis of the main screw roll 4. Further, it is preferred in production standpoint that all the sub-screw rolls 5 are same in shape. Therefore, the following description is limited only to one sub-screw roll engaging with the main screw roll 4.

The possibility of removing the barrel while leaving the main and sub-screw rolls engaged, depends upon the taper extent of the main and the sub-screw rolls, the depth of the engagement therebetween and the clearance between the rolls and the barrel. This will be clearly understood by the geometrical analysis according to the accompanied drawings.

Figure 5:
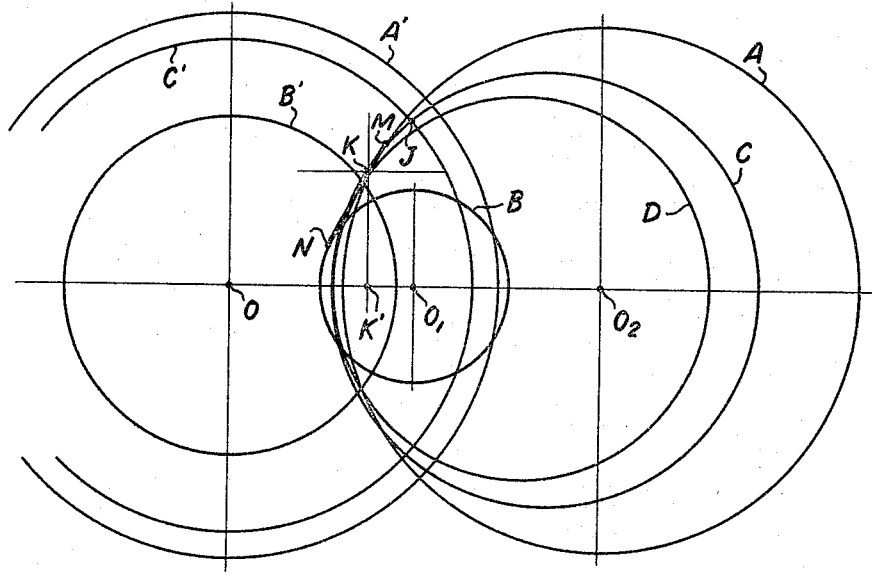
FIG. 5 shows projections of some cross-sections of the screw rolls on a plan perpendicular to the axis of the main screw roll.

FIGURE 5 schematically depicts projections of various sections of a tapered sub-screw roll 5 and a tapered main roll 4. As viewed in the figure, the nose end of the extruder is located nearest to the observer. Each circular curve represents a cross-section of a roll taken through a plane perpendicular to the axis of main screw roll 4. Curves A, C, D, and B respectively represent sections of sub-screw roll 5 as one approaches the nose end of the extruder. Curves A', C', and B' respectively represent sections of the main screw roll 4 as one approaches the nose end of the extruder. The sections represented by curves A and A', B and B', C and C', are respectively taken in a common plane; accordingly the intersection points of the curves A and A', B and B', or C and C' each represent the point of engagement of the rolls in the particular plane involved.

The required relationship between the tapered rolls may be investigated by considering several specific points. First, the upper intersection of curves C and C' is designated J and represents the intersection of the main and sub-screw rolls in a particular plane intermediate the two ends of the extruder. Second, it is possible to establish a discretely defined coordinate system by determining a point K and using this point to locate the ordinate axis in a coordinate system which uses a line between the axes of the main and sub-screw rolls as the abscissa. Point K is determined by constructing a common tangent $\overline{MN}$ between curves A, C, D, and B are utilizing the intersection of this tangent with curve C. The ordinate axis is then defined by a line $\overline{KK'}$ which is orthogonal to the abscissa $\overline{OO_1}$ and passes through point K.

It will be appreciated that the projection of any section of sub-screw roll 5 that is nearer to the nose end of the extruder than the section represented by C, that is to the right of line $\overline{KK'}$, will be included within the circle C. With this in mind, the problem of developing a single piece barrel for this type of extruder can be graphically demonstrated.

Figure 6:
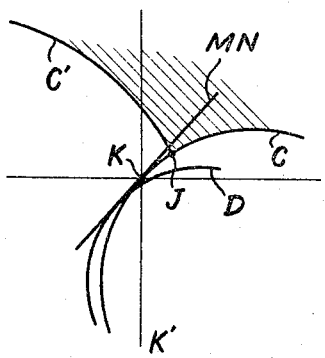
FIGS. 6 and 7 illustrate details of these projections.

FIG. 6 shows an arrangement in which the engage point J of a typical section represented by the curve C, C' is in the first quadrant of the first coordinates comprising an abscissa through the points 0 and $0_1$ and an ordinate through the point 0 and perpendicular to said abscissa; and also, the point J is in the first quadrant of the second coordinates comprising an abscissa and an ordinate parallel with those of said first coordinates respectively and including the original point K.

In this drawing, a section of the barrel for enclosing the rolls, taken through the plane of the curve C, would have a periphery CJC' and is indicated by hatching. In this case, all barrel portions beyond the illustrated section are disposed upwardly from the periphery CJC', and all screw roll sections closer than this section and on the right hand side of the line $\overline{KK'}$ are disposed within the curve C. Thus, the barrel is removable along the axis of the main screw roll 4.

Figure 7:
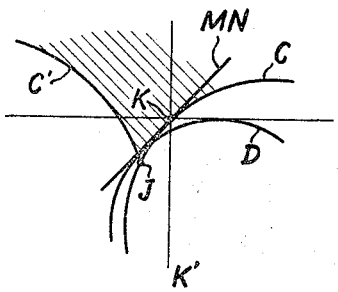

FIG. 7 shows an inoperative arrangement in which the engage point J is in the first quadrant of said first coordinates and also in the third quadrant of said second coordinates. In this case, some portions of a section D, closer than the section C will be disposed outside of the curve C and disposed upwardly from the periphery CJC', thus the barrel becomes impossible to remove along the axis of the main screw roll due to the interruption between the barrel and the sub-screw roll 5 at the area shown as HJK.

As described above, the barrel is removable when the engage point J is in the corresponding quadrants of the first and second coordinates. Thus, the barrel can be made removable along the axis of the main screw roll by properly selecting the angle of intersection and the relation between the location of the engage point and the sectional projections.

Examples

Vinyl chloride powder was extruded using the apparatus in accordance with the present invention. Type A, B, and C differ in extruder capacity to each other and in the Examples 1–4, the detail dimensions were varied to measure the effect on the volumetric discharge and on the nature of the extruded material.

Example 1

A 2½ inch pipe, outer dia. 76 mm. and thickness 4.5 mm. was extruded by the type B extruder of which the intersection angle between the main roll and the sub-roll is 4°; $P_1=24$ mm., $P_2=18$ mm., the longitudinal normal clearance at the coarse thread portion is 4.0 mm., and that at the fine thread portion is 1.4 mm. The main screw roll was rotated at a speed of 20 r.p.m., the barrel temperatures were adjusted to 90, 120, 150 and 160° C. respectively, die temperatures were adjusted to 170 and 170° C. respectively. Thus, the extruding rate of 77 kg./hr. was obtained with the extruding power of 18 p.s. The physical property test has proved that the extruded pipe withstands the internal hydraulic pressure of 87 kg./cm.$^2$ and the tensile stress of 500 kg./cm.$^2$.

Example 2

A 2½ inch pipe was extruded by the type B extruder of which the intersection angle between the main roll and the sub-roll is 4°, $P_1=28$ mm., $P_2=18$ mm., the longitudinal normal clearance at the coarse thread portion is 6.0 mm., and that at the fine thread portion is 1.4 mm. The main screw roll was rotated at a speed of 20 r.p.m., the temperatures of the barrel and the die were adjusted the same as in the Example 1.

Thus, the extruding rate of 78 kg./hr. was obtained with the extruding power of 18 p.s. The physical property test has proved that the extruded pipe withstands the internal hydraulic pressure of 88 kg./cm.$^2$ and the tensile stress of 580 kg./cm.$^2$.

Example 3

A 4 inch pipe, outer dia. 114 mm. and thickness 7 mm., was extruded by the type B extruder of which the intersection angle between the main roll and the sub-roll is 4°, $P_1=24$ mm., $P_2=18$ mm., the longitudinal normal clearance at the coarse thread portion is 4.0 mm., and that at the fine thread portion is 1.4 mm. The main screw roll was rotated at speed of 20 r.p.m., the temperature of the barrel and the die were adjusted the same as in the Example 1. Thus, the extruding rate of 80 kg./hr. was obtained with the extruding power of 18 p.s. The physical property test has proved that the extruded pipe withstands the tensile stress of 550 kg./cm.$^2$.

Example 4

A 2½ inch pipe was extruded by the type B extruder of which the intersection angle between the main roll and the sub-roll is 4°, $P_1=24$ mm., $P_2=18$ mm., the longitudinal normal clearance at the coarse thread portion is 4.1 mm., and that at the fine thread portion is 1.7 mm.

The main screw roll was rotated at speed of 20 r.p.m., the temperatures of the barrel and the die were adjusted same as in the Example 1. Thus, the extruding rate of 75 kg./hr. was obtained with the extruding power of 18 p.s. The physical property test has proved that the extruded pipe withstands the internal hydraulic pressure of 76 kg./cm.$^2$ and the tensile stress of 560 kg./cm.$^2$.

*Example 5*

A 4 inch pipe was extruded by the type C extruder of which the intersection angle between the main roll and the sub-roll is 4°, $P_1=32$ mm., $P_2=22$ mm., the longitudinal normal clearance at the coarse thread portion is 4.8 mm., and that at the fine thread portion is 2.6 mm. The main screw roll was rotated at a speed of 20 r.p.m., the temperatures of the barrel and the die were adjusted same as in the Example 1. Thus, the extruding rate of 140 kg./hr. was obtained with the extruding power of 40 p.s. The physical property test has proved that the extruded pipe withstands the tensile stress of 530 kg./cm.$^2$.

The intersection angle between the main roll and the sub-roll should preferably be in the range of 3°–5°, provided that the extruder has sufficient compression ratio and the one-piece barrel is removable along the axis of the main roll. If the angle is too small, the screw rolls must have increased length to obtain sufficient compression ratio, and if the angle is too large, it becomes impossible to remove the barrel along said axis.

In the extruder according to the present invention, the plastic material is introduced from the coarse thread portion, under pressure, through the circular groove into the fine thread portion. Compression ratio of the coarse thread portion with the circular groove is 1:3–1:4.

The fine thread portion is preferably constructed to provide kneading action principally.

The quantity extruded in each revolution of the screw roll depends on the volume defined by the screw thread which is determined by the shape of the groove and the tip diameter of the screw.

The screw diameter may be determined from the required tangential velocity at the periphery thereof, and the cross-sectional area of the groove can be determined from the screw diameter.

The width of the groove shall be determined so as to be able to prevent mutual interference of the screw rolls. As the screw diameter is small at the fine thread portion, i.e., kneading portion, there may exist tendency of interference, so that the pitch of the screw must be kept minimum. As the screw diameter is relatively large at the root portion of the screw roll, interference will not possibly occur, so that the screw pitch can be kept relatively large.

As an experimental result, the ratio of the fine pitch $P_2$ to the coarse pitch $P_1$ should be preferably about 1:1.25–1:1.55, and the period, during which the plastic material stays in the barrel, should be preferably determined between 6–10 minutes. The above mentioned period is required for sufficient heating and kneading of the plastic material. In this case, the lengthwise normal clearance of the screw is preferably selected as 0.1 $P_2$ at the fine thread portion and as 0.15–0.2 $P_1$ at the coarse thread portion.

The clearance of the fine thread portion has an influence on the kneading effect of the plastic, and that of the coarse thread portion has an influence on the introducing efficiency.

The products obtained by the apparatus in accordance with the present invention have been proved to satisfy the standard requirements for water pressure and tension tests.

The details of the structure may be modified substantially without departing from the spirit of the invention and exclusive use of such modifications as come within the scope of appended claims is contemplated.

What we claim is:

1. An extruder adapted to extrude material from one end, comprising a tapered main screw roll, a plurality of tapered sub-screw rolls engaging with said main roll, a barrel which encircles said main and sub-screw rolls when engaged, the angle of intersection between the axes of said main screw roll and each sub-screw roll being within the range 3°–5° in order to obtain a sufficient compression ratio, said barrel being of one-piece construction and mounted removably along the axis of said main screw roll, and said main and sub-screw rolls being formed so as not to interfere with said barrel during the removal thereof.

2. An extruder according to claim 1, wherein each of said main and sub-screw rolls has a coarse thread portion at the root portion, a fine thread portion at the tip portion, and a circular groove interposed between said two portions.

3. An extruder according to claim 2, wherein the ratio of the pitch of said fine and coarse thread portion is in the range of 1:1.25–1:1.55.

4. An extruder according to claim 3, wherein said coarse thread portion with the circular groove is threaded to give a compression ratio required and to melt the material, and said fine thread portion is designed with a fine pitch thread for applying complete kneading to said molten material.

5. An extruder according to claim 4, wherein said compression ratio is 1:3–1:4.

6. An extruder according to claim 5, wherein longitudinal normal clearance of the threads at the coarse thread portion is selected 0.15–0.2 times the pitch value thereof, and that at the fine thread portion is selected 0.07–0.12 times the pitch value thereof.

7. An extruder according to claim 1, wherein said coarse thread portion with the circular groove is threaded to give a compression ratio required and to melt the material, and said fine thread portion is designed with a fine pitch thread for applying complete kneading to said molten material.

8. An extruder according to claim 1, wherein longitudinal normal clearance of the threads at the coarse thread portion is selected 0.15–0.2 times the pitch value thereof, and that at the fine thread portion is selected 0.07–0.12 times the pitch value thereof.

References Cited

UNITED STATES PATENTS

| | | | |
|---|---|---|---|
| 2,466,934 | 4/1949 | Dellenbarger | 18—12 |
| 2,802,238 | 8/1957 | Colombo | 18—12 |
| 3,104,420 | 9/1963 | Selbach | 18—12 |
| 3,114,177 | 12/1963 | Colombo | 18—12 |
| 3,146,493 | 9/1964 | Steinle et al. | 18—12 |

FOREIGN PATENTS

| | | |
|---|---|---|
| 903,086 | 7/1949 | France. |
| 879,861 | 7/1949 | Germany. |
| 899,743 | 6/1962 | Great Britain. |
| 929,629 | 6/1963 | Great Britain. |

WILLIAM J. STEPHENSON, *Primary Examiner.*